US005366689A

United States Patent [19]

Säiner

[11] Patent Number: 5,366,689

[45] Date of Patent: Nov. 22, 1994

[54] HOT-ISOSTATIC PRESS WITH HINGE-LIKE MOVEMENT TO ACCOMODATE EXPANSION

[75] Inventor: Bengt O. Säiner, Helsingborg, Sweden

[73] Assignee: Asea Brown Boveri AB, Västeras, Sweden

[21] Appl. No.: 822,947

[22] Filed: Jan. 21, 1992

[30] Foreign Application Priority Data

Mar. 12, 1991 [SE] Sweden ............................ 9100743-5

[51] Int. Cl.[5] .......................... B22F 1/02; A23G 3/00

[52] U.S. Cl. ........................................ 419/49; 419/68; 425/405.2

[58] Field of Search .................. 419/49, 68; 425/405.2

[56] References Cited

U.S. PATENT DOCUMENTS

| | | | |
|---|---|---|---|
| 4,575,327 | 11/1986 | Borchert et al. | 425/405.2 X |
| 4,738,610 | 4/1988 | Chiang et al. | 425/405.2 X |
| 4,834,917 | 5/1989 | Ramm et al. | 419/49 X |
| 5,057,273 | 10/1991 | Hanson | 419/68 |
| 5,063,022 | 11/1991 | Zick | 419/49 |
| 5,080,573 | 1/1992 | Schaidl et al. | 425/405.2 X |
| 5,154,882 | 10/1992 | Zick | 419/49 |
| 5,227,576 | 7/1993 | Howard | 419/68 X |

*Primary Examiner*—Peter A. Nelson

*Attorney, Agent, or Firm*—Watson, Cole, Grindle & Watson

[57] ABSTRACT

A hot-isostatic press comprising a load-carrying member (1) adapted to be supported by a substantially annular support member. The annular support member is arranged on an underlying support (4) and encloses a heat insulation (10). Further, at least part of the annular support member is arranged in the form of a number of axial segments (3), which are arranged side-by-side and are connected at the top and bottom to adjacent members by means of an attachment which guides the segment in a hinge-like movement relative to adjacent members to take up the radial movements which arise in the segment as a result of the temperature gradient between the upper and lower parts of said support member. The height of the heat insulation corresponds at most to the beginning of the axial segments. (FIG. 1 )

6 Claims, 1 Drawing Sheet

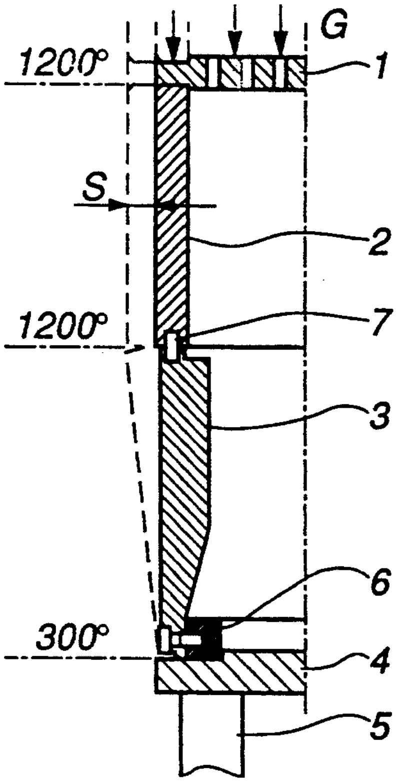
FIG. 1
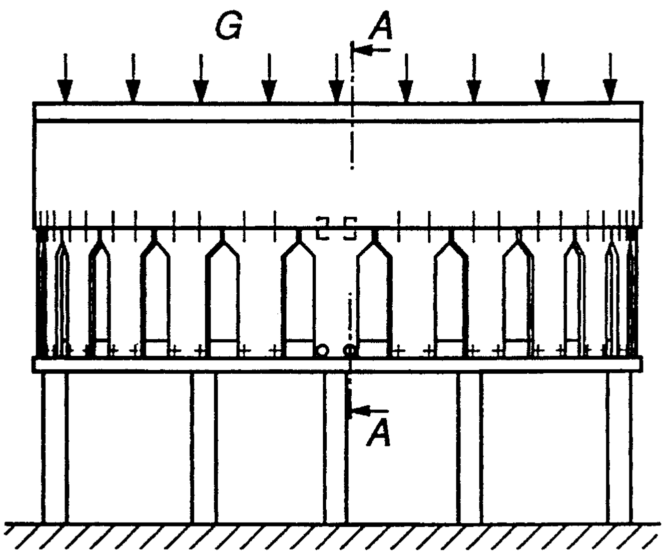
FIG. 2
FIG. 3
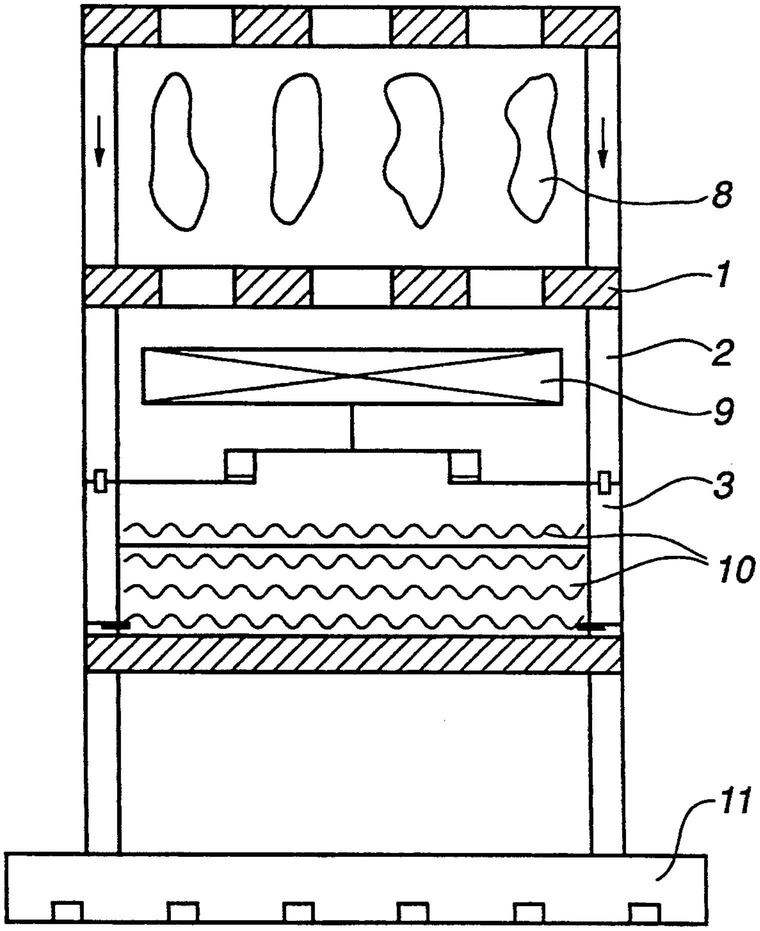

HOT-ISOSTATIC PRESS WITH HINGE-LIKE MOVEMENT TO ACCOMODATE EXPANSION

BACKGROUND OF THE INVENTION

1. Field of the Invention

The present invention relates to a hot-isostatic press comprising one or more charging means and substantially cylindrical support members supporting the charging means and enclosing heat insulation and a possible heater.

2. Prior Art

The load or charge which is intended to be compacted is positioned inside a hot-isostatic press and is placed on a normally perforated plate which is supported by a cylindrical ring or a tube. The cylindrical ring or tube is supported by an annular member located therebelow and which extends around the circumference, the annular member being supported by round plate placed at the bottom. The entire structure may be placed on a number of legs. This structure may be varied, e.g., the legs and/or the upper ring may possibly be omitted. Inside the ring/tube, a bottom heater is normally located. Great temperature differences occur between the different parts in the press, which, inter alia, gives rise to considerable radial movements, especially at the upper parts of the annular member. In connection with forced cooling of the furnace, cold gas is sometimes injected from below, which further increases the problems. During a press cycle considerable differences in radial movements arise, which may cause damage to, inter alia, the annular member which has so far consisted of a whole ring. Such a ring is expensive to manufacture and damage thereto may entail considerable breakdowns.

SUMMARY OF THE INVENTION

The invention aims to solve the above-mentioned and associated problems in a hot-isostatic press. The hot-isostatic press is adapted to comprise a load-carrying member, preferably in the form of a plate, which is supported by a substantially annular support member, the annular support member being arranged on an underlying support, preferably in the form of a bottom plate, and to enclose a heat insulation. The hot-isostatic press according to the invention is characterized in that at least part of the annular support member is arranged in the form of a number of axial segments, arranged side by side, these axial segments being connected at tops and bottoms thereof to adjacent members by means of an attachment which is adapted to guide the segment in a hinge-like movement relative to the adjacent members(s) and take up the radial movements which arise in the segment as a result of the temperature gradient between the upper and lower parts of the support members, and that the height of the mentioned heat insulation corresponds at most to the height of the axial segments.

By radial movements are meant those movements which arise as a result of differences in radial expansion between parts above and below the annular member. By designing the annular member as axially extending segments or plates and forming and supporting these such that hinge-like movements arise upon radial expansions caused by temperature, damage to this part of the press is avoided, while at the same time the plates are easy and inexpensive to manufacture and replacement can easily be performed.

The bottom insulation of the furnace is formed such that its thickness corresponds at most to the length of the axial segments, so that the temperature drop between the furnace and the outer part substantially takes place in the region where the annular member is arranged.

In an alternative embodiment, an upper ring supporting the charge is placed between the charge and its support plate, and below this upper ring the above described annular member is placed.

By "hinge-like movements" are meant, besides movements arising in the classic hinges, also other angular deviations between adjacent members, for example from the axial plate to the upper ring or to the lower part.

BRIEF DESCRIPTION OF THE DRAWINGS

The invention will be exemplified in greater detail with reference to the accompanying figures, wherein FIG. 1 is a section A—A of FIG. 2, which shows a load carrier in the press according to the invention. FIG. 3 is an explanatory sketch of the inventive press.

DESCRIPTION OF THE PREFERRED EMBODIMENTS

FIG. 3 shows a basket comprising a perforated plate 1 supporting the charge/load 8. Several baskets may be placed on top of each other.

The load with the plate 1 is supported by an upper ring 2 and a lower annular member comprising a number of axial plates 3 located side-by-side, joined together in the manner shown below (see FIG. 1). Inside the upper ring 2 there is placed a heater 9 and below this heater, on a level with the annular member, heat-insulating members 10, for example multiple layers of corrugated sheets, are placed. 11 designates a water-cooled bottom plate.

In an alternative embodiment the upper ring 2 is not used, but the annular member directly supports the charge with the plate 1.

FIGS. 1 and 2 show a perforated plate 1 supporting the load/charge 8. The round perforated plate 1 is supported by the tube or the ring 2, which is whole and substantially cylindrical.

Below the tube/ring 2, according to the invention, there are placed a number of circumferential, axially extending sheet segments or plates 3, each one provided, at at least two locations at the contact surface with the ring 2, with recesses for guide pins 7, located in these and corresponding recesses in the ring 2. There should be a certain play in these recesses so that hinge-like movements may take place between the plate and the ring/tube 2, while at the same time no mentionable tilting of the plates in the lateral direction may take place.

Below the plates 3 there is placed a round plate 4, and the lower parts of the plates are fixed, preferably by means of bolted joints, to a deformable, weak ring 6, which is thus allowed a certain deformation and thus a hinge-like movement relative to the plate 3. 5 designates a support column.

The great temperature differences arising upon heating and possible cold gas injection give rise to radial movements in the plates 3 (see the dashed lines in FIG. 1). The temperature at the upper ring 2 and at the upper part of the plate 3 may, for example, be 1200° C., whereas the temperature at the lower part of the plate 3 may be 300° C., which explains the great differences in radial expansion between the upper and lower parts of the plates 3, which can now arise without causing damage to parts 3 or 2. The ring 2 may expand without the parts 3 being damaged.

Because of the vertically positioned sheet segments/-plates 3, which by their individual attachment by bolted joints and the like to the ring 6 may freely incline radially outwardly, these may follow the thermal expansion of the tube 2 or the difference in radial expansion at the top and bottom of the plates 3. Because of the hinge function at the upper and lower parts of the segment 3, symmetrical expansion takes place, the central position of part 2 relative to the lower plate 4, etc., thus being maintained and the entire load carrier remaining mechanically stable. Thus, the sheet segments replace a previous tube, which because of thermal stresses was rapidly deformed. This increases the service life of the construction and considerably reduces the manufacturing costs.

In the above example a hot-isostatic press has been described; however, the scope of the invention also includes resistance-heated furnaces, possibly vacuum furnaces, and the scope need not be limited to high pressures.

The invention can be varied in many ways within the scope of the following claims.

I claim:

1. A hot-isostatic press comprising a load-carrying member , preferably in the form of a plate, arranged to be supported by a substantially annular support member, wherein the annular support member is arranged on an underlying support, preferably in the form of a bottom plate, and wherein the annular support member is adapted to enclose a heat insulation, wherein at least part of the annular support member is arranged in the form of a number of axial segments arranged side by side, said axial segments are adapted to be connected at the top and bottom to adjacent members by means of an attachment, the attachment being adapted to guide the segment in a hinge-like movement relative to the adjacent members to take up the radial movements which arise in the segment as a result of a temperature gradient between the upper and lower parts of the axial segments.

2. A hot-isostatic press according to claim 1, wherein said annular support member includes an upper ring arranged above said axial segments, said load-carrying member resting against said upper ring.

3. A hot-isostatic press according to claim 2, including pins at contact surface between said axial segments and said upper ring, said pins being disposed in recesses in the segments and the upper ring, respectively.

4. A hot-isostatic press according to claim 2, wherein at contact surface between said load-carrying plate or said upper ring and axial segments and/or between the segments and the underlying support, projections are arranged in segments, the load-carrying plate, the upper ring or the underlying support, said projections engaging with corresponding recesses in the opposite members, or alternatively that opposite recesses are arranged in both the members and in an intermediate piece engaging in both the recesses, to guide the members in a mutual hinge-like movement in connection with the radial movements arising as a result of temperature changes.

5. A hot-isostatic press according to claim 1 wherein said axial segments are attached to a deformable ring by means of bolted members arranged in a lower or upper part of said segment.

6. A hot-isostatic press according to claim 1, wherein said annular support member is partially gas-permeable.

* * * * *